US012313248B2

(12) United States Patent
Baier et al.

(10) Patent No.: US 12,313,248 B2
(45) Date of Patent: May 27, 2025

(54) INDUSTRIAL LUMINAIRE

(71) Applicant: Murrelektronik GmbH, Oppenweiler (DE)

(72) Inventors: Bastian Baier, Oppenweiler (DE); Ralf Böing, Oppenweiler (DE)

(73) Assignee: MURRELEKTRONIK GMBH (DE)

( * ) Notice: Subject to any disclaimer, the term of this patent is extended or adjusted under 35 U.S.C. 154(b) by 0 days.

(21) Appl. No.: 18/372,223

(22) Filed: Sep. 25, 2023

(65) Prior Publication Data

US 2024/0102641 A1 Mar. 28, 2024

(30) Foreign Application Priority Data

Sep. 26, 2022 (EP) .................................... 22197731

(51) Int. Cl.

*F21V 23/00* (2015.01)
*F21V 3/02* (2006.01)
*F21V 21/005* (2006.01)
*F21V 23/06* (2006.01)

(52) U.S. Cl.

CPC .............. *F21V 23/003* (2013.01); *F21V 3/02* (2013.01); *F21V 21/005* (2013.01); *F21V 23/06* (2013.01)

(58) Field of Classification Search

CPC .......... F21V 23/003; F21V 23/06; F21V 3/02; F21V 21/005

See application file for complete search history.

(56) References Cited

U.S. PATENT DOCUMENTS

| | | | |
|---|---|---|---|
| 9,699,856 B2 | 7/2017 | Roberts et al. | |
| 9,863,611 B2 | 1/2018 | Gutekunst et al. | |
| 10,482,728 B2 | 11/2019 | Rosenberg et al. | |
| 2015/0300606 A1 | 10/2015 | Gutekunst et al. | |
| 2017/0316660 A1* | 11/2017 | Chong | G08B 5/36 |
| 2019/0152433 A1* | 5/2019 | Cumbo | G07C 9/00714 |
| 2019/0325714 A1 | 10/2019 | Rosenberg et al. | |
| 2019/0376656 A1* | 12/2019 | Papoular | F21V 21/30 |
| 2023/0184415 A1 | 6/2023 | Frankly | |

FOREIGN PATENT DOCUMENTS

| | | | |
|---|---|---|---|
| DE | 102012023190 | A1 | 5/2014 |
| DE | 102015122811 | A1 | 6/2017 |
| DE | 102019109182 | A1 | 10/2019 |
| DE | 102019105997 | A1 | 9/2020 |
| EP | 3029645 | A1 | 6/2016 |
| EP | 2106197 | B1 | 11/2018 |
| KR | 20190141989 | A | 12/2019 |
| WO | 2021222951 | A1 | 11/2021 |

* cited by examiner

*Primary Examiner* — Mary Ellen Bowman
(74) *Attorney, Agent, or Firm* — Dilworth IP, LLC

(57) ABSTRACT

An industrial luminaire having at least two segments, a first segment including a lamp which is configured to illuminate a room and/or an environment, and a second segment including a signal generator which is configured to provide a signal as a function of an information, wherein each of the segments is adapted to be driven independently of the other segment and wherein a signal can be output and, at the same time, a room and/or an environment can be illuminated by the segments.

15 Claims, 2 Drawing Sheets

INDUSTRIAL LUMINAIRE

FIELD OF THE DISCLOSURE

Embodiments of the present disclosure relate to an industrial luminaire having at least two segments.

BACKGROUND

Lighting devices are often installed in machines and at workstations to illuminate an environment. Furthermore, information is frequently provided to workers at identical locations through separate signaling devices. For example, visual or acoustic signals are used to inform about malfunctions or other events or to issue warning messages.

In order to implement illumination and signal output at the same location, several devices are often installed in parallel.

In the case of an optical signal output, however, depending on the illumination of the surroundings, it may occur that the optically output signal is only perceived with a delay. This is a disadvantage because it may take some time for a worker to perceive the information in question, which may lead to delays.

In addition, the local conditions may make it difficult to place the required devices, in particular in such a way that sufficient illumination of the environment is possible and, at the same time, (optical) signal output can be ensured.

SUMMARY

It is the object to remove the drawbacks known from the prior art in a simple and cost-effective manner.

The object is achieved by an industrial luminaire including at least two segments, a first segment including a lamp which is configured to illuminate a room and/or an environment, and a second segment including a signal generator which is configured to provide a signal as a function of an information. Each of the segments is adapted to be driven independently of the other segment. A signal can be output and, at the same time, a room and/or an environment can be illuminated by means of the segments.

The fundamental idea of the present disclosure is to provide a plurality of segments that allow the functions of illuminating as well as signal emitting basically independently of each other. Illuminating (the surroundings) by means of the illumination light involves illuminating a room, i.e. emitting light. This is known from ceiling lights. In contrast, signal output by means of the signal light, which is emitted by the signal generator, is about visually displaying a piece of information. This means that different functions are involved. Nevertheless, both functions can be realized at the same time at the same place with a single device. For example, if a signal is to be output, it is not absolutely necessary to (temporarily) dispense with the illumination function for this reason, and vice versa.

However, this may be intended in order to place the focus on the signal output, which allows to make sure that the signal will actually be perceived. For example, for this purpose the lighting by means of the lamp is at least dimmed or even switched off.

Preferably, the industrial luminaire is configured in accordance with a machine directive, that is, in conformity with the Machinery Directive, in particular in accordance with the DIN EN 60204-1 standard.

This means that in addition to its illumination function, it can also function as a standardized indicator light. This may serve, among other things, to signal a status or a corresponding piece of information.

In this connection, it may be provided that the signal generator is adapted and configured to output light signals, in particular light signals of different colors, the color of the light indicating a state of an environment and/or of the luminaire.

In particular, the color red may be intended to indicate a dangerous condition, the color yellow to indicate a non-normal or impending critical condition, and the color green to indicate a normal condition.

The signal generator may further be adapted and configured to emit blue light, in particular to indicate that an action by an operator is required and/or to acknowledge a command.

In addition, provision may be made that the signal generator is adapted and configured to emit white light in order to indicate a neutral state. A white light signal may be emitted in particular when none of the previously mentioned conditions clearly applies. Alternatively or supplementarily, it may also be provided that the white light is used to acknowledge a command.

Basically, the light, in particular the color of the light, serves to output a signal in the sense of a status or an information, so that a user directly receives the associated information on the basis of the light signal, i.e. the color of the light. In that sense, therefore, it is a signal color that is output by means of the industrial luminaire.

In order to be able to provide several different pieces of information or statuses, the industrial luminaire is in particular configured to emit several different light signals and/or light colors.

In a further variant of the industrial luminaire, provision is made that the first segment and the second segment are oriented in relation to each other such that the lamp of the first segment and the signal generator of the second segment emit light in different spatial directions.

In particular, the segments may be oriented relative to each other such that the lamp does not directly illuminate an observation point at which a light signal of the signal generator can be observed. This prevents a user to whom something is to be signaled by means of the signal generator from being dazzled by the lamp. Nevertheless, it is possible that the user receives the information output by means of the signal color.

According to one aspect of the present disclosure, at least one of the segments may comprise both a lamp and a signal generator. Preferably, all of the segments of the industrial luminaire comprise both a lamp and a signal generator. This allows the areas of the industrial luminaire employed for illumination purposes and the areas of the industrial luminaire employed for signaling purposes to be varied. In particular, this allows illumination and/or signal output into a particular area of the surroundings or in a particular direction.

For example, an indirect illumination of the surroundings or an indirect signaling is ensured by providing the illumination and/or signal output along a wall toward the ceiling, if the industrial luminaire is mounted to a wall.

In a preferred embodiment, the industrial luminaire includes at least one separating structure between the segments, which spatially separates the at least two segments from each other. Preferably, the at least one separating structure is formed by a light-impervious web. This ensures that light emitted by the lamps does not impair the signals provided by the signal generators. Interfering stray light can thus be avoided, so that the segments of the industrial luminaire do not affect the functionalities of the respective other segments. In particular, this ensures that the respectively emitted light does not mix, i.e. the light emitted by the signal generator for transmitting information, in particular the signal light or the color of the light, and the illumination light for illuminating the surroundings.

It may be provided that the industrial luminaire includes a base, wherein each of the at least two segments has a signaling surface facing away from the base. The base allows for quick and easy installation of the segments. In addition, the base may be used for fitting the industrial luminaire to a wall or the ceiling. In particular, the base may also serve to bring together electrical connections of the components located in the segments, in particular of the lamps and the signal generators. The signaling surfaces may be used for the emission of light for illumination purposes and/or for the output of signals. A spatial separation of the signaling surfaces from the base prevents the illumination and/or signaling function(s) from being impaired or spatially restricted by cables and/or connections. In particular, in this way no shadow effects are produced by internal components of the industrial luminaire, since all of these components are associated with the base, so that they are not arranged within the direction of illumination of the lamp. In other words, the lamp has a lighting direction that is (essentially) directed from the base toward at least one signaling surface.

The signaling surfaces may each be formed as at least partially transparent surfaces here. This allows light to be coupled out of the respective segments. As it exits, the light can be dispersed, for example, by diffusers arranged on the partially transparent surfaces in order to improve homogeneity of the illumination. Also, it can be ensured in this way that no dazzling effect occurs.

It is further conceivable that the signaling surface of at least one segment comprises an at least partially transilluminable symbol, in particular a warning symbol. Within the segment, the light that is generated by a lamp and/or a signal generator shines through the transilluminable symbol when it exits the industrial luminaire, so that persons, for example workers, can easily recognize the symbol when looking at the industrial luminaire. The illuminated symbol may serve to warn persons of at least one (predefined) danger, in particular depending on the application, for example a warning of gas leakage in the case of a gas-processing plant. Preferably, in the unlit state, the symbol is not or hardly recognizable for persons. Whether or not a signal is output can thus be prescribed by means of the light emission alone.

The symbols may be printed and/or glued and/or laminated and/or stamped directly onto the at least partially transparent surface from the inside or outside, for example.

Alternatively or additionally, the symbols may also be generated by active masking. For example, an LCD or e-ink display may be mounted in or on one of the semitransparent surfaces. Using the display, a masking or transparency adjustment can then be performed in places depending on an external signal, so that corresponding transilluminable symbols are formed in the display area.

A further aspect of the present disclosure provides that the segments are arranged in a semicircle or trapezoidal shape in a cross-section of the industrial luminaire. In particular, the cross-section may be perpendicular to a longitudinal axis of the industrial luminaire. This allows a technically simple assembly and, when the industrial luminaire is mounted on a ceiling, allows illumination and/or signal output in all spatial or ambient directions.

It is further conceivable that the signal generator is configured to emit a light signal, in particular a flashing signal. For this purpose, provision may be made that the industrial luminaire comprises a controller that drives the signal generator with alternating and/or pulsed voltage curves and/or current profiles, which are then converted into the flashing signal by the signal generator. It is conceivable here that the controller adjusts the alternating and/or pulsed voltage curves and/or current profiles on the basis of external information. In principle, various different flashing frequencies or flashing patterns can be generated in this way. The flashing frequency and/or the flashing pattern may be unique for the particular danger of which warning is to be given.

Alternatively or additionally, other types of signal generators may of course also be provided. For example, the use of light emitters of different colors and/or loudspeakers for generating acoustic signals is conceivable.

A further aspect of the present disclosure provides that the industrial luminaire comprises three or more segments which are adjacent to each other and each include a signal generator and/or a lamp. The signal generators and/or lamps of all segments may in particular be coordinated with each other such that they emit light one after the other. To this end, a controller may also be provided which drives the signal generators and/or lamps one after the other (in terms of time). This allows the light emission of a rotating flashing beacon to be imitated, for example. In particular, a moving light or a bar display can be formed over the multiple segments in this way.

In general, the individual segments of the industrial luminaire may themselves be segmented again, in particular along a longitudinal axis of the industrial luminaire. For example, a segment may comprise a plurality of sub-segments, through which motion patterns, such as chase light functions, can be generated. In this way, the attention of persons can be drawn to the industrial luminaire and/or the respective segment. This type of sub-segmentation also allows a bar display, which can be used as a filling level indicator, for example, to be implemented in a technically simple manner.

It is also conceivable that the sub-segments can be illuminated in different colors, for example in the colors red, yellow and green. In this way, a segment can be utilized as a traffic light, among other things.

The sub-segments may in turn be separated from each other by separating structures to prevent scattering effects among the sub-segments.

It is further conceivable that the industrial luminaire comprises a user interface which is configured such that, when actuated, it resets a signal output by the signal generator and/or switches the at least one lamp on or off. This provides a facility for users to interact with the industrial luminaire. For example, when a user has already received a signal or information, he or she can acknowledge this by making an input at the user interface and/or reset the signal that has been output. In this way, the respective segment is no longer blocked and can be used to output further signals.

It may also be provided that the user interface is touch-sensitive and/or arranged on a signaling surface of a segment. In particular, the user interface may be configured as a touch sensor or touch screen. This allows a simple and intuitive operation.

A further aspect of the present disclosure provides that the industrial luminaire comprises a first connection for transmitting information and/or energy to the industrial luminaire, in particular a first IO-Link interface. This permits a standardized communication of the industrial luminaire with other IO-Link devices, in particular sensors and actuators and/or other industrial luminaires and/or an IO-Link master.

Alternatively or additionally, the industrial luminaire may however also comprise further connections, including, in particular:

- discrete connections by multicore cables or plug connectors, and/or
- connections for discrete power supply and control via wireless standards, for example Wi-Fi, IO-Link Wireless, Bluetooth, 5G, and/or
- connections of power carrying systems, such as ASI, SPE (single pair Ethernet), PoE (Power over Ethernet), USB, and/or
- connections for discrete power supply and control via interfaces, in particular fieldbuses such as CANopen, ProfiBus, ProfiNet, EthernetIP, EtherCAT as well as conventional interfaces such as RS232, RS485, RS422, and DALI.

For discrete power supply of the industrial luminaire, connections with 24 V, 48 V, 110 V and 250 V are more particularly conceivable. 24 V connections are frequently employed in industry. The use of 48 V connections is also advantageous, since twice the power can be transmitted via the supply line as compared to the 24 V connections prevalent in the prior art. To implement such a connection, the industrial luminaire may be equipped in particular with a wide voltage range power supply unit covering the nominal voltages of 24 V and 48 V.

Especially when interconnecting a plurality of industrial luminaires and/or for larger installations, 48 V connections are of advantage, since less losses occur compared to 24 V systems.

It is further conceivable that the industrial luminaire includes at least one second connection for transmitting information and/or energy, in particular a second IO-Link interface. In this case, the first and second connections are configured such that they can be used to interconnect a plurality of industrial luminaires, in particular in a series connection.

This configuration allows a plurality of industrial luminaires to be connected to each other and installed in a technically simple manner. Such an interconnection is suitable, for example, for illumination and/or signal output at assembly areas having a plurality of stations or aisles.

In particular, it is conceivable that the string or line of luminaires formed in this way is an IO-Link device. The individual industrial luminaires may be provided with a fixed allocation here. Alternatively, the individual industrial luminaires may be activated by a master using asynchronous mechanisms. Communication between the individual industrial luminaires is preferably performed via the IO-Link interfaces.

In this context, it is conceivable that the first and second connections are (each) configured such that, in a series connection of industrial luminaires, information and/or data of a preceding industrial luminaire can be transmitted to the industrial luminaire by means of the first connection, and the information and/or data of the preceding luminaire and the industrial luminaire can be transmitted to a subsequent industrial luminaire.

A further aspect of the present disclosure provides that the industrial luminaire is adapted to be connected to various further components. These may be, for example, sensors or actuators, in particular pushbuttons or limit switches, which can be used to trigger a signaling and/or to switch the lighting on and/or off and/or to reset a fault.

An example of such a further component is a motion detector that is adapted to be connected to the industrial luminaire and can be used to switch the lighting of the industrial luminaire on when a person moves within the sensor field of the motion detector. As an alternative, the industrial luminaire itself may also comprise a permanently installed motion detector.

Connection of the further components to the industrial luminaire may be realized directly by means of its outputs, in particular connector plugs. Alternatively, a connection may also be effected by digital communication and/or radio.

BRIEF DESCRIPTION OF THE DRAWINGS

Further features and advantages of the present disclosure will be apparent from the description below and from the drawings, to which reference is made and in which.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
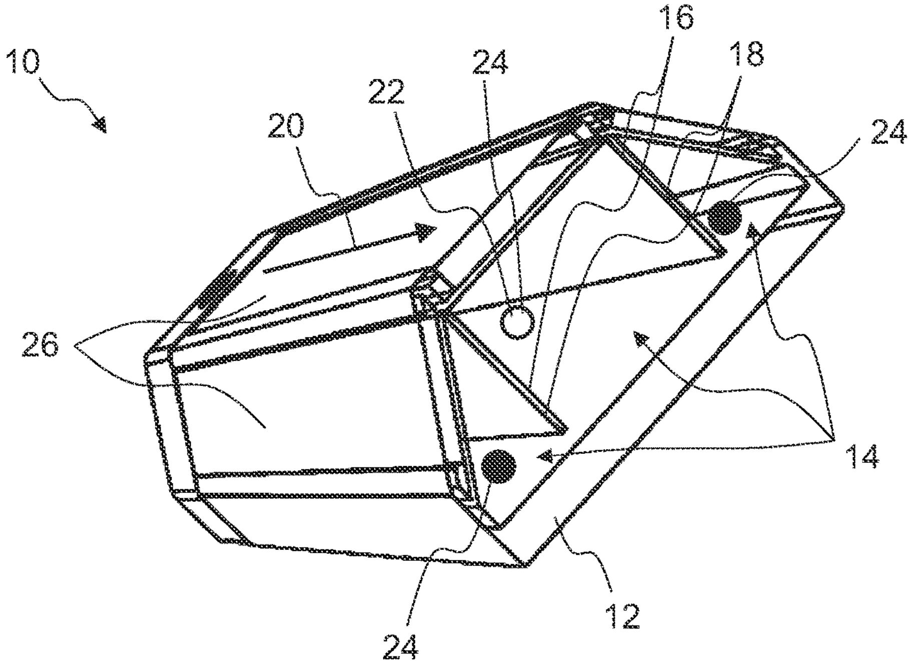
FIG. 1 shows a schematic three-dimensional sectional representation of an industrial luminaire according to the present disclosure.

FIG. 1 shows a schematic sectional representation of an industrial luminaire 10 according to the present disclosure. The industrial luminaire 10 is of an oblong design and comprises a base 12 and three segments 14, which are spatially delimited from one another by separating structures 16.

In the exemplary embodiment, the separating structures 16 are light-impervious webs 18 extending from the base 12 and made, for example, from an injection-molded plastic or from a metal sheet. The webs 18 here project perpendicularly from a base surface of the base 12.

As viewed in a cross-section perpendicular to a longitudinal axis 20 of the industrial luminaire 10, the three segments 14 are arranged next to each other in a trapezoidal shape, in particular in such a way that the three segments 14 together with the base 12 form an isosceles and symmetrical trapezoid in said cross-section. This results in maximum distinguishability of the three segments 14.

Of course, industrial luminaires 10 according to the present disclosure that have more than three segments 14 are also conceivable. In this case, the segments 14 may, for example, be arranged in a semicircle.

In the exemplary embodiment shown, the middle one of the three segments 14 includes a lamp 22, for example a light-emitting diode or a light-emitting diode array. The lamp 22 is configured to illuminate a room and/or an environment, in particular a workstation.

The two outer segments 14, that is, those adjoining the opposite ends of the middle segment 14, each include a signal generator 24 that is adapted to output a signal as a function of an information, In the exemplary embodiment, the signal generator 24 is also a light-emitting diode or a light-emitting diode array that is driven by a controller. The controller generates electrical signals in response to the information, for example an alert message that has been input, which are then converted into light signals by the signal generator 24.

In particular, the light signals may be color signals and/or flashing light signals. This will attract the attention of signal receivers, in particular persons such as workers, to the industrial luminaire 10 and/or to the signals emitted.

Alternatively or additionally, various other types of signal generators 24 are also conceivable, for example acoustic signal generators.

In the exemplary embodiment, the three segments 14 are adapted to be driven independently of each other. A light can be generated for illumination purposes by means of the middle segment 14, and at the same time a signal can be output by means of the outer segments 14.

In other words, an illumination function and a signaling function of the industrial luminaire 10 can be used simultaneously.

In this regard, the middle segment 14 and the outer segments 14 are oriented in relation to each other such that the lamp 22 of the middle segment 14 and the signal generators 24 of the outer segments 14 emit light in different spatial directions.

The orientation of the segments 14 relative to each other here is such that the lamp 22 does not directly illuminate an observation point at which a light signal of at least one of the signal generators 24 can be observed. As a result, users or observers who are at the observation point and are looking toward the signal generator 24 will not be dazzled by the light of the lamp 22.

In the exemplary embodiment, the industrial luminaire 10 is a standardized indicator light constructed in accordance with the DIN EN 60204-1 standard, i.e. an industrial luminaire that conforms to the Machinery Directive.

At least one of the signal generators 24 is adapted and configured to output light signals of different colors, the colors of which indicate a state of an environment and/or of the industrial luminaire 10, i.e. convey a status and/or information.

In this context, it is provided that the color red serves to indicate a dangerous state, the color yellow serves to indicate a non-normal or impending critical state, and the color green serves to indicate a normal state.

In the exemplary embodiment, the signal generator 24 is further adapted and configured to emit blue light, in particular to indicate that an action by an operator is required.

The signal generator 24 may further be adapted and configured to emit blue light, in particular to indicate that an action by an operator is required and/or to acknowledge a command.

Furthermore, the signal generator 24 is adapted and configured to emit white light to indicate a neutral state. In the exemplary embodiment, a white light signal is emitted in particular when none of the aforementioned states clearly applies. It may alternatively or supplementarily also be provided that the white light is used to acknowledge a command.

Provision may also be made for one or more of the segments 14 to comprise both a lamp 22 and a signal generator 24. In particular, it is conceivable that one or more of the segments 14 are equipped with light-emitting diodes that can be employed as both a lamp 22 and a signal generator 24. In the exemplary embodiment, the lamp 22 arranged in the middle segment 14 can also be used as a signal generator 24 at the same time.

Here, the controller can drive the signal generators 24 or lamps 22 of the three segments 14 such that they emit light signals one after the other. In this way, for example, the light emission of a semicircular rotating beacon can be imitated.

In order that the light emitted by the lamps 22 or signal generators 24 does not exit the industrial luminaire 10 in a concentrated point shape, the three segments 14 in the exemplary embodiment each include a partially transparent light-scattering signaling surface 26.

The lamps 22 and/or signal generators 24 are arranged between the base 12 and the respective signaling surface 26 here. This allows for easy assembly and/or maintenance. For example, if a lamp 22 or signal generator 24 of a segment 14 is defective, the associated signaling surface 26 can simply be removed and the defective part can be replaced.

Figure 2:
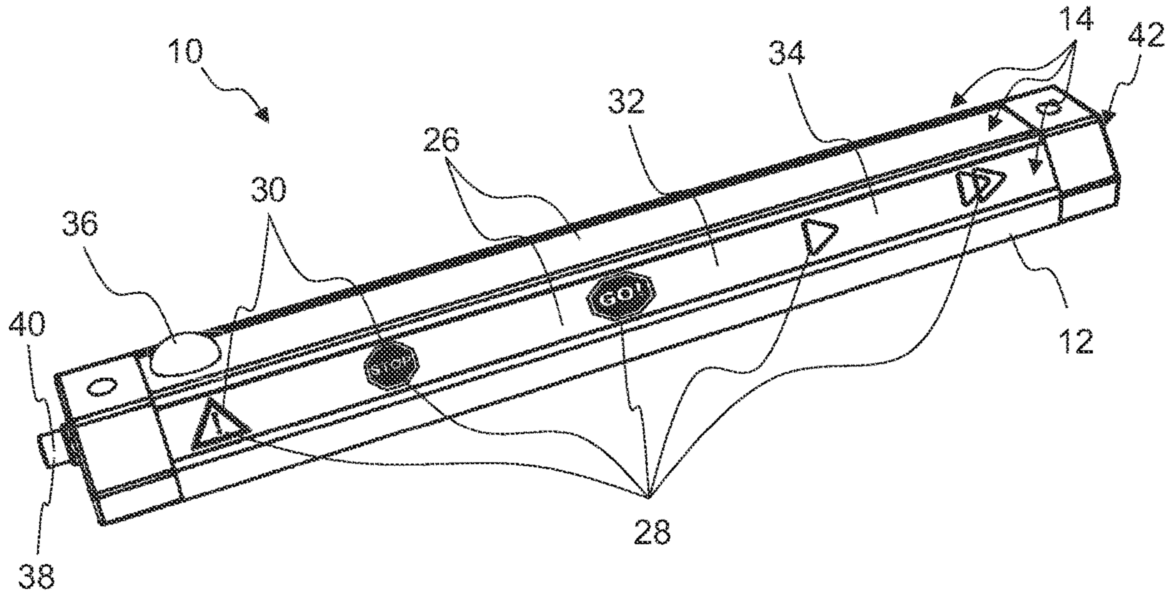
FIG. 2 shows a schematic three-dimensional representation of the industrial luminaire of FIG. 1.

FIG. 2 shows a schematic three-dimensional representation of the industrial luminaire 10 as viewed from one side.

As is apparent from FIG. 2, the signaling surface 26 of one of the lateral segments 14 includes a plurality of symbols 28, in particular warning symbols 30.

The symbols 28 may, for example, be printed directly on the signaling surface 26 or may be located on a film that has been applied to the signaling surface 26 or back injection molded during manufacture.

In the exemplary embodiment, the symbols 28 are transilluminable. This makes the symbols 28 easily recognizable by persons when the signal generator 24 of the corresponding segment 14 emits a light signal.

Furthermore, the industrial luminaire 10 includes a user interface 32.

In the exemplary embodiment, the user interface 32 is a touch-sensitive touchscreen 34 formed on the signaling surface 26 of one of the outer segments 14.

The user interface 32 allows users to interact with the industrial luminaire 10. In particular, the user interface 32 allows a signal that has been output to be reset and/or the lamp 22 to be switched on or off. For example, if a user wishes to reset a warning signal that has been output by the industrial luminaire 10, the user can do so by tapping the associated symbol 28.

The industrial luminaire 10 shown in FIG. 2 furthermore includes a motion detector 36, which is configured to detect movements of persons present in the vicinity and, in the event a movement is detected, to switch the lamp 22 on and/or off. Alternatively or additionally, the motion detector 36 may also be configured to activate one of the signal generators 24 in the event of a motion being detected such that the signal generator 24 outputs or resets a signal.

Moreover, the industrial luminaire 10 includes a first connection 38 on one face side. In the exemplary embodiment, this is a discrete interface, in particular an IO-Link interface 40, via which the industrial luminaire 10 can be driven and supplied with electrical energy. Here, the nominal voltage of the connection 38 is 24 V and/or 48 V.

The industrial luminaire 10 further includes a second connection 42 on a face side opposite the first connection 38. In FIG. 2, this second connection is concealed by the industrial luminaire 10.

The second connection 42 is likewise in the form of an IO-Link interface 40 and is provided for transmitting information and/or energy to the industrial luminaire 10 or from the industrial luminaire 10 to other elements.

In this context, the first and second connections 38, 42 are configured such that they can be used for interconnecting a plurality of industrial luminaires 10.

Figure 3:
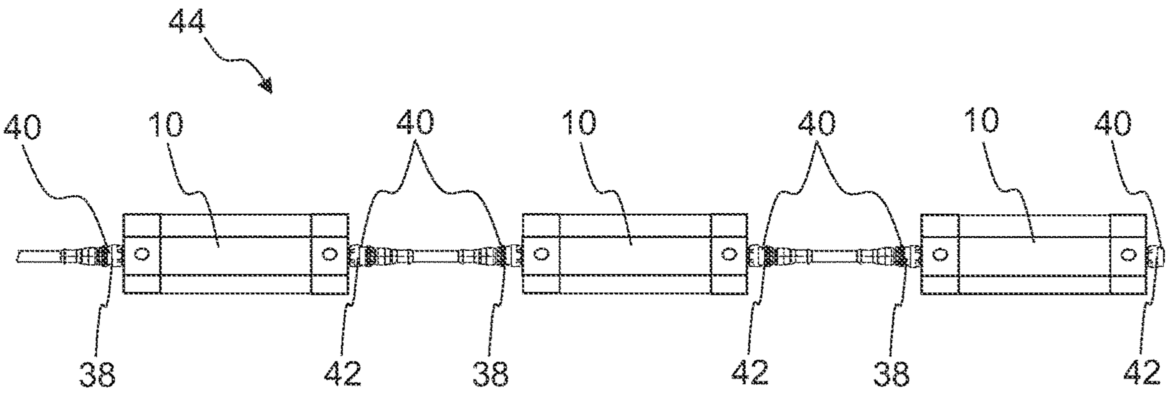
FIG. 3 shows a schematic representation of a series connection of three industrial luminaires.

FIG. 3 shows such an interconnection in the form of a series connection 44 of three industrial luminaires 10.

The first connections 38 of the industrial luminaires 10 are configured to transfer the data of all industrial luminaires 10 preceding in the series in the series connection 44. The second connections 42 are also configured to forward the data of all industrial luminaires 10 preceding in the series to the industrial luminaire 10 that follows in the series.

This allows a data set with all industrial luminaires 10 of the series connection 44 to be established, which can be used to prepare a process image and/or to selectively activate the individual industrial luminaires 10.

Alternatively or additionally, the industrial luminaires 10 may of course also include one or more other types of connection, in particular discrete multicore cable IO-Link as well as Wi-Fi, radio and/or Bluetooth.

Furthermore, other components may also be connected to the industrial luminaire 10 using the first and second connections 38, 42.

Figure 4:
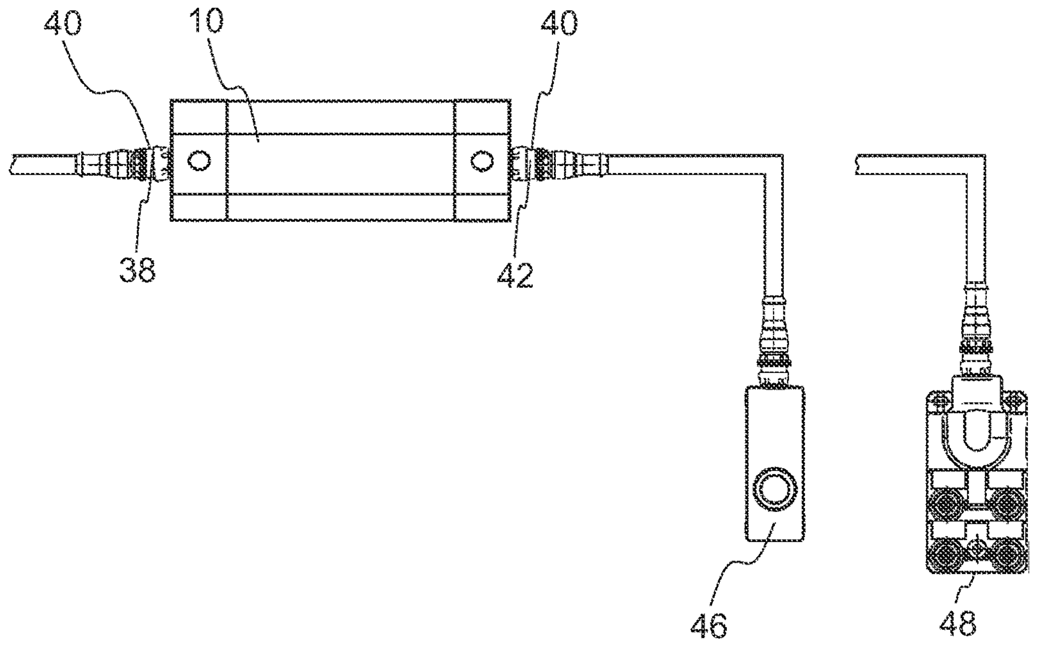
FIG. 4 shows a schematic representation of an industrial luminaire with components connected.

This is shown as an example in FIG. 4. In the figure, the industrial luminaire 10 is connected to an additional sensor 46, for example a door opening sensor, by means of the second connection 42. Alternatively or additionally, the industrial luminaire 10 can also be connected to further input devices 48, by means of which users can, for example, enter information, switch the lamp 22 on or off and/or reset output signals.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. An industrial luminaire comprising at least three segments, a first segment comprising a lamp which is configured to illuminate a room and/or an environment, a second segment comprising a signal generator which is configured to provide a signal as a function of an information, and a third segment comprising a signal generator or a lamp, wherein each of the segments is adapted to be driven independently of the other segments and wherein a signal can be output and, at a same time, the room and/or the environment can be illuminated by means of the segments, wherein the at least three segments are adjacent to each other in a semicircle or in a trapezoidal shape in a cross-section of the industrial luminaire, and the signal generators and/or lamps of the at least three segments being coordinated with each other such that they emit light one after the other, wherein the industrial luminaire further comprises a base, wherein each of the segments has a signaling surface facing away from the base, and wherein the industrial luminaire further comprises at least one separating structure between the segments, which spatially separates the segments from each other, wherein the at least one separating structure is formed by a light-impervious web which projects perpendicularly from the base such that light emitted by the lamp(s) does not impair the signals provided by the signal generator (s).

2. The industrial luminaire according to claim 1, wherein at least one of the segments comprises both a lamp and a signal generator.

3. The industrial luminaire according to claim 1, wherein the signaling surfaces are each formed as at least partially transparent surfaces.

4. The industrial luminaire according to claim 1, wherein the signaling surface of at least one segment comprises an at least partially transilluminable symbol.

5. The industrial luminaire according to claim 4, wherein the at least partially transilluminable symbol is a warning symbol.

6. The industrial luminaire according to claim 1, wherein the signal generator is configured to emit a light signal.

7. The industrial luminaire according to claim 1, wherein the signal generator is configured to emit a flashing signal.

8. An industrial luminaire comprising at least two segments, a first segment comprising a lamp which is configured to illuminate a room and/or an environment, and a second segment comprising a signal generator which is configured to provide a signal as a function of an information, wherein each of the segments is adapted to be driven independently of the other segment and wherein the signal can be output and, at a same time, the room and/or the environment can be illuminated by means of the segments, including a user interface which is configured such that, when actuated, it resets the signal emitted by the signal generator and/or switches the at least one lamp on or off, thereby enabling a user to acknowledge receipt of the information by making an input at the user interface, wherein the industrial luminaire further comprises a base, wherein each of the segments has a signaling surface facing away from the base, and wherein the industrial luminaire further comprises at least one separating structure between the segments, which spatially separates the segments from each other, wherein the at least one separating structure is formed by a light-impervious web, which projects perpendicularly from the base such that light emitted by the lamp does not impair the signals provided by the signal generator.

9. The industrial luminaire according to claim 8, wherein the user interface is touch-sensitive, for example a touch sensor or touch screen, and wherein the user interface is arranged on the signaling surface of a segment.

10. The industrial luminaire according to claim 1, including a first connection for transmitting information and/or energy to the industrial luminaire.

11. The industrial luminaire according to claim 10, wherein the first connection is a first IO-Link interface.

12. The industrial luminaire according to claim 10, wherein the first connection is configured to supply the industrial luminaire and/or an interconnection of a plurality of industrial luminaires with a voltage of 24 V and/or 48 V.

13. The industrial luminaire according to claim 10, including at least one second connection for transmitting information and/or energy, wherein the first and second connections are configured such that a plurality of industrial luminaires can be interconnected by means of the connections.

14. An industrial luminaire comprising at least two segments, a first segment comprising a lamp which is configured to illuminate a room and/or an environment, and a second segment comprising a signal generator which is configured to provide a signal as a function of an information, wherein each of the segments is adapted to be driven independently of the other segment and wherein a signal can be output and, at a same time, the room and/or an environment can be illuminated by means of the segments, wherein the industrial luminaire further comprises a base, wherein each of the segments has a signaling surface facing away from the base, and wherein the industrial luminaire further comprises at least one separating structure between the segments, which spatially separates the segments from each other, wherein the at least one separating structure is formed by a light-impervious web, which projects perpendicularly from the base such that light emitted by the lamp does not impair the signals provided by the signal generator.

15. The industrial luminaire according to claim 1, wherein the cross-section of the industrial luminaire is perpendicular to a longitudinal axis of the industrial luminaire.

* * * * *